(12) United States Patent
Grover et al.

(10) Patent No.: US 12,050,720 B2
(45) Date of Patent: Jul. 30, 2024

(54) BLOCKCHAIN AUDITING SYSTEM AND METHOD

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/762,708

(22) PCT Filed: Jan. 11, 2021

(86) PCT No.: PCT/US2021/012965
§ 371 (c)(1),
(2) Date: Mar. 22, 2022

(87) PCT Pub. No.: WO2022/150049
PCT Pub. Date: Jul. 14, 2022

(65) Prior Publication Data
US 2022/0366088 A1    Nov. 17, 2022

(51) Int. Cl.
*H04L 9/00* (2022.01)
*G06F 21/60* (2013.01)
(Continued)

(52) U.S. Cl.
CPC ............ *G06F 21/64* (2013.01); *G06F 21/602* (2013.01); *H04L 9/3236* (2013.01); *H04L 9/50* (2022.05)

(58) Field of Classification Search
CPC ....... H04L 9/50; H04L 9/3236; H04L 63/123; G06F 21/64; G06F 21/602
(Continued)

(56) References Cited

U.S. PATENT DOCUMENTS 9,807,106 B2   10/2017   Daniel
10,009,118 B2    6/2018   Ouzounov
(Continued)

FOREIGN PATENT DOCUMENTS

| CN | 109753825 | 5/2019 |
|---|---|---|
| CN | 111209339 | 5/2020 |
| EP | 3540624 A1 | 9/2019 |

OTHER PUBLICATIONS

International Search Report/Written Opinion; PCT/US2021/012965; dated Oct. 1, 2021; 8 Pages.
(Continued)

*Primary Examiner* — Amare F Tabor
(74) *Attorney, Agent, or Firm* — Sheridan Ross P.C.

(57) ABSTRACT

A copy of a blockchain is stored. The stored copy of the blockchain is copied from a blockchain in a distributed blockchain ledger. An event associated with the blockchain in the distributed ledger is identified. In response identifying the event associated with the blockchain in the distributed ledger, a compromise of the blockchain in the distributed ledger is identified, such as, identifying one or more blocks of the blockchain that have been compromised. In a second embodiment, a request to add a new block to a blockchain is identified. In response identifying the request to add the new block to the blockchain, a consensus vote to add the new block to the blockchain is monitored. A determination is made to determine if the consensus vote is below a threshold. In response to the consensus vote being below the threshold, an audit of the blockchain is completed.

48 Claims, 6 Drawing Sheets

(51) Int. Cl.
*G06F 21/64* (2013.01)
*H04L 9/32* (2006.01)

(58) Field of Classification Search
USPC .................................................. 713/189
See application file for complete search history.

(56) References Cited

U.S. PATENT DOCUMENTS

| | | | |
|---|---|---|---|
| 10,075,298 | B2 | 9/2018 | Struttmann |
| 10,360,191 | B2 * | 7/2019 | Christidis ............ G06F 16/1865 |
| 10,523,443 | B1 | 12/2019 | Kleinman |
| 10,700,850 | B2 | 6/2020 | Ma et al. |
| 10,708,040 | B1 | 7/2020 | Winarski |
| 10,721,073 | B2 | 7/2020 | Lampkins et al. |
| 10,735,204 | B2 | 8/2020 | Cheng et al. |
| 10,735,207 | B2 | 8/2020 | Cheng et al. |
| 10,819,503 | B2 | 10/2020 | Nandakumar |
| 10,831,933 | B2 | 11/2020 | Brady et al. |
| 10,986,097 | B2 | 4/2021 | Sloane et al. |
| 11,068,338 | B2 | 7/2021 | Lu et al. |
| 11,108,544 | B2 | 8/2021 | Vouk et al. |
| 11,113,241 | B1 | 9/2021 | Winarski |
| 11,139,980 | B2 | 10/2021 | Herrin et al. |
| 11,146,381 | B2 | 10/2021 | Miller et al. |
| 11,151,236 | B2 | 10/2021 | Nandakumar et al. |
| 11,294,991 | B2 | 4/2022 | Savanah et al. |
| 11,379,827 | B2 * | 7/2022 | Ben-David ......... G06Q 20/0658 |
| 11,468,345 | B2 | 10/2022 | Gidney |
| 11,599,668 | B2 * | 3/2023 | Nation ................. H04L 9/3247 |
| 11,614,926 | B2 * | 3/2023 | Xiao .................... H04L 9/3239 |
| | | | 717/177 |
| 11,621,825 | B2 * | 4/2023 | Winarski ............. H04L 9/3239 |
| | | | 713/165 |
| 11,621,836 | B2 * | 4/2023 | Ashrafi ................ H04L 9/0858 |
| | | | 713/171 |
| 11,621,858 | B2 * | 4/2023 | Irazabal ............... H04L 9/0894 |
| | | | 713/158 |
| 2016/0028552 | A1 | 1/2016 | Spanos |
| 2017/0075941 | A1 | 3/2017 | Finlow-Bates |
| 2017/0230189 | A1 | 8/2017 | Toll |
| 2017/0264428 | A1 | 9/2017 | Seger, II |
| 2017/0302663 | A1 | 10/2017 | Nainar |
| 2018/0337769 | A1 | 11/2018 | Gleichauf |
| 2019/0012249 | A1 | 1/2019 | Mercuri |
| 2019/0114584 | A1 | 4/2019 | Toohey |
| 2019/0140822 | A1 | 5/2019 | Xie |
| 2019/0356493 | A1 | 11/2019 | Fisher et al. |
| 2020/0014542 | A1 | 1/2020 | McIver et al. |
| 2020/0344051 | A1 | 10/2020 | Ashrafi |
| 2020/0351399 | A1 | 11/2020 | Young et al. |
| 2020/0371833 | A1 | 11/2020 | Baset |
| 2020/0372154 | A1 | 11/2020 | Bacher et al. |
| 2020/0374106 | A1 * | 11/2020 | Padmanabhan ..... G06F 16/1837 |
| 2020/0412524 | A1 | 12/2020 | Das et al. |
| 2021/0135880 | A1 | 5/2021 | Cheng et al. |
| 2021/0209077 | A1 * | 7/2021 | Snellman ............. G06F 16/219 |
| 2021/0264362 | A1 | 8/2021 | Bryant et al. |
| 2021/0391997 | A1 | 12/2021 | Krause et al. |
| 2022/0067669 | A1 * | 3/2022 | Griffin ................. G16Y 40/20 |

OTHER PUBLICATIONS

Nikolaos Alexopoulos, et al; "Towards Blockchain-Based Collaborative Intrusion Detection Systems"; Telecooperation Group, Darmstadt, DE; 2020; 12 pages.

Rui Zhang, et al; "Security And Privacy On Blockchain"; University of Chinese Academy of Sciences, China; ACM Comput. Surv., vol. 52, No. 3, Article 51, Publication date: Jul. 2019; 46 pages.

Partial Supplementary Search Report for European Patent Application No. 21918004.9, dated Aug. 3, 2023, 20 pages.

* cited by examiner

BLOCKCHAIN AUDITING SYSTEM AND METHOD

FIELD

The disclosure relates generally to blockchain systems and particularly to systems and methods for auditing blockchains.

BACKGROUND

One of the key advantages of blockchain technology is that it is difficult for a blockchain to be compromised because of the distributed nature of the blockchain ledger. The assumption is that the data within a blockchain is immutable. However, this may not always be the case. For example with quantum computing, it is becoming easier to break a blockchain by creating bad entries and flooding the ledger mechanism to gain more than a 50% consensus in the blockchain. This is even more likely with new blockchains because the number of nodes that contain the ledger are smaller.

In addition, quantum computing can be used to create meaningful hash collisions. By creating meaningful hash collisions, an attacker can modify data within the blockchain while still resulting in the same hash.

Moreover, a user of the blockchain may be compromised. For example, a user's private key/device may have been compromised by a hacker (i.e. using a quantum factoring attack), which can result in data and/or transactions, in the blockchain being compromised.

SUMMARY

These and other needs are addressed by the various embodiments and configurations of the present disclosure. A copy of a blockchain is stored. The stored copy of the blockchain is copied from a blockchain in a distributed blockchain ledger. An event associated with the blockchain in the distributed ledger is identified (e.g., a new block being added to the blockchain ledger). In response identifying the event associated with the blockchain in the distributed ledger, a compromise of the blockchain in the distributed ledger is identified, such as, identifying one or more blocks of the blockchain that have been compromised.

In a second embodiment, a request to add a new block to a blockchain is identified. In response identifying the request to add the new block to the blockchain, a consensus vote to add the new block to the blockchain is monitored. A determination is made to determine if the consensus vote is below a threshold. In response to the consensus vote being below the threshold, an audit of the blockchain is completed.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The terms "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a Merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hash cash algorithm generally requires the following parameters: a service string, a nonce, and a counter. The service string can be encoded in the block header data structure, and include a version field, the hash of the previous block, the root hash of the Merkle tree of all transactions (or information or data) in the block, the current time, and the difficulty level. The nonce can be stored in an extra Nonce field, which is stored as the left most leaf node in the Merkle tree. The counter parameter is often small at 32-bits so each time it wraps the extra Nonce field must be incremented (or otherwise changed) to avoid repeating work. When validating or verifying a block, the hash cash algorithm repeatedly hashes the block header while incrementing the counter & extra Nonce fields. Incrementing the extra Nonce field entails re-computing the Merkle tree, as the transaction or other information is the left most leaf node. The body of the block contains the transactions or other information. These are hashed only indirectly through the Merkle root.

As described herein and in the claims, doing a "forward hash" comprises doing individual hashes of each of the individual blocks in a blockchain from a genesis block (the first block that is added to the blockchain when the blockchain is first created) to the latest block in the blockchain. The forward hashed individual blocks in the blockchain do not include a new block that is being added to the blockchain unless stated otherwise.

As described herein and in the claims, doing a "reverse hash" comprises doing individual hashes of each of the individual blocks in a blockchain in a reverse order (from the latest block to the genesis block). The reversed hashed individual blocks in the blockchain do not include a new block that is being added to the blockchain unless stated otherwise.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
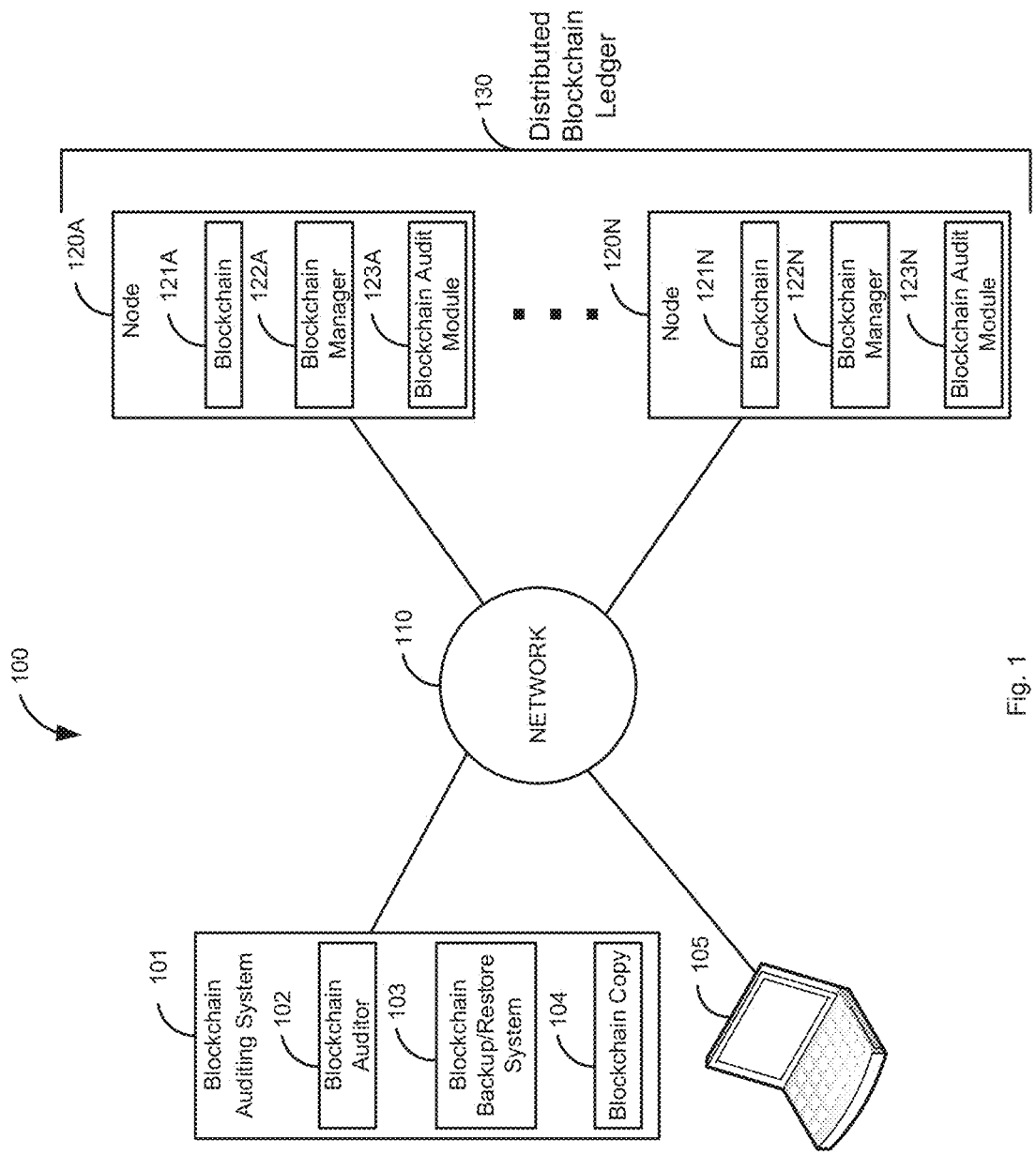
FIG. 1 is a block diagram of a first illustrative system for auditing a blockchain using a separate blockchain auditing system.

FIG. 1 is a block diagram of a first illustrative system 100 for auditing a blockchain 121 using a separate blockchain auditing system 101. The first illustrative system 100 comprises the blockchain auditing system 101, a communication endpoint 105, a network 110, and nodes 120A-120N. The first illustrative system 100 is an environment where the auditing of the blockchain 121A-121N is done by a separate system (the blockchain auditing system 101).

The blockchain auditing system 101 can be more may include any hardware coupled with software that can independently audit a blockchain 121 (i.e., the distributed ledger 130). The blockchain auditing system 101 may reside in any type of networked device, such as, a server, a Personal Computer (PC), and/or the like. The blockchain auditing system 101 further comprises a blockchain auditor 102, a blockchain backup/restore system 103, and a blockchain copy 104. In one embodiment, the blockchain auditing system 101 may be located in one of the nodes 120A-120N. In this embodiment, the blockchain auditing system is a separate process.

The blockchain auditor 102 can be or may include any hardware coupled with software that can audit the blockchains 122A-122N in the distributed ledger 130. The blockchain auditor 102 can audit the blockchains 122A-122N in various ways as described herein.

The blockchain backup/restore system 103 can be or may include any hardware coupled with software that can backup/restore the blockchains 121A-121N. The blockchain backup/restore system 103 stores off the blockchain copy 104 that can be used as part of an auditing process and/or backup/restore process.

The blockchain copy 104 is a copy of the blockchain 121. The blockchain copy 104 is used to determine if the blockchain 121 has been compromised. The blockchain copy 104 includes the data of the blockchain 121 even if the data of the blockchain 121 has a link to the data. A blockchain 121 can be implemented where the blockchain 121 does not actually contain the data associated with the transaction. For example, the blockchain 121 may contain a link to a database table that has the data. When a new block is added to the blockchain 121, the copy of the blockchain 104 stores the data of the newly added block, even if the blockchain 121 only has a link to the data. If there is only a link to the data in the blockchain 121, the blockchain auditor 102 copies the data into the blockchain copy 104 (including the link information). This is done so that the data can be used to detect if the blockchain 121 has become compromised. The blockchain copy 104 may also be used as part of a backup/restore process, which can also include restoring the data where the link points.

The communication endpoint 105 can be or may include any communication endpoint device that can communicate on the network 110, such as a Personal Computer (PC), a telephone, a video system, a cellular telephone, a Personal Digital Assistant (PDA), a tablet device, a notebook device, a smart phone, and the like. The communication endpoint 105 is a device where a communication session(s) ends. The communication endpoint 105 is not a network element(s) that facilitate and/or relay a communication session in the network 110, such as a communication manager or router. The communication endpoint 105 can be used to configure the blockchain auditing system 101 and/or the nodes 120A-120N.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Integrated Services Digital Network (ISDN), and the like. Thus, the network 110 is an electronic communication network configured to carry messages via packets and/or circuit switched communications.

The nodes 120A-120N can be or may include any hardware coupled with software that can store and manage the blockchain 121A-121N. The nodes 120A-120N may be a server, a PC, and/or the like. The nodes 120A-120N further comprise the blockchains 121A-121N, blockchain managers 122A-122N, and blockchain audit modules 123A-123N.

The blockchains 121A-121N are copies of a blockchain 121 that form the distributed blockchain ledger 130. The blockchains 121A-121N normally have a forward hash over data in each block in the blockchain 121 that is calculated to ensure that none of the blocks in the blockchain 121 have been compromised. The forward hash is calculated in a forward direction as blocks are added to the blockchain 121. In some instances, the blockchains 121A-121N may have a reverse hash that is a backward hash on individual blocks in the blockchains 121A-121N.

As described herein, when referring to the blockchain 121 (singular), it refers each of the blockchains 121A-121N in the distributed ledger 130. This is because, each of the blockchains 121A-121N are supposed be a copy of the same blockchain 121.

The blockchain managers 122A-122N manages the blockchains 121A-121N and the addition of new blocks to the blockchains 121A-121N. The blockchain managers 122A-122N manage the process of verifying forward and/or reverse hashes when new blocks are added to the blockchains 121A-121N. The blockchain managers 122A-122N are also voting nodes that vote as part of a consensus vote when new blocks are added to the blockchain 121.

The blockchain audit modules 123A-123N work in conjunction with the blockchain auditing system 101 to manage the auditing of the blockchains 121A-121N. The blockchain auditing modules 123A-123N may manage how the nodes 120A-120N can vote during a consensus vote as described herein.

Figure 2:
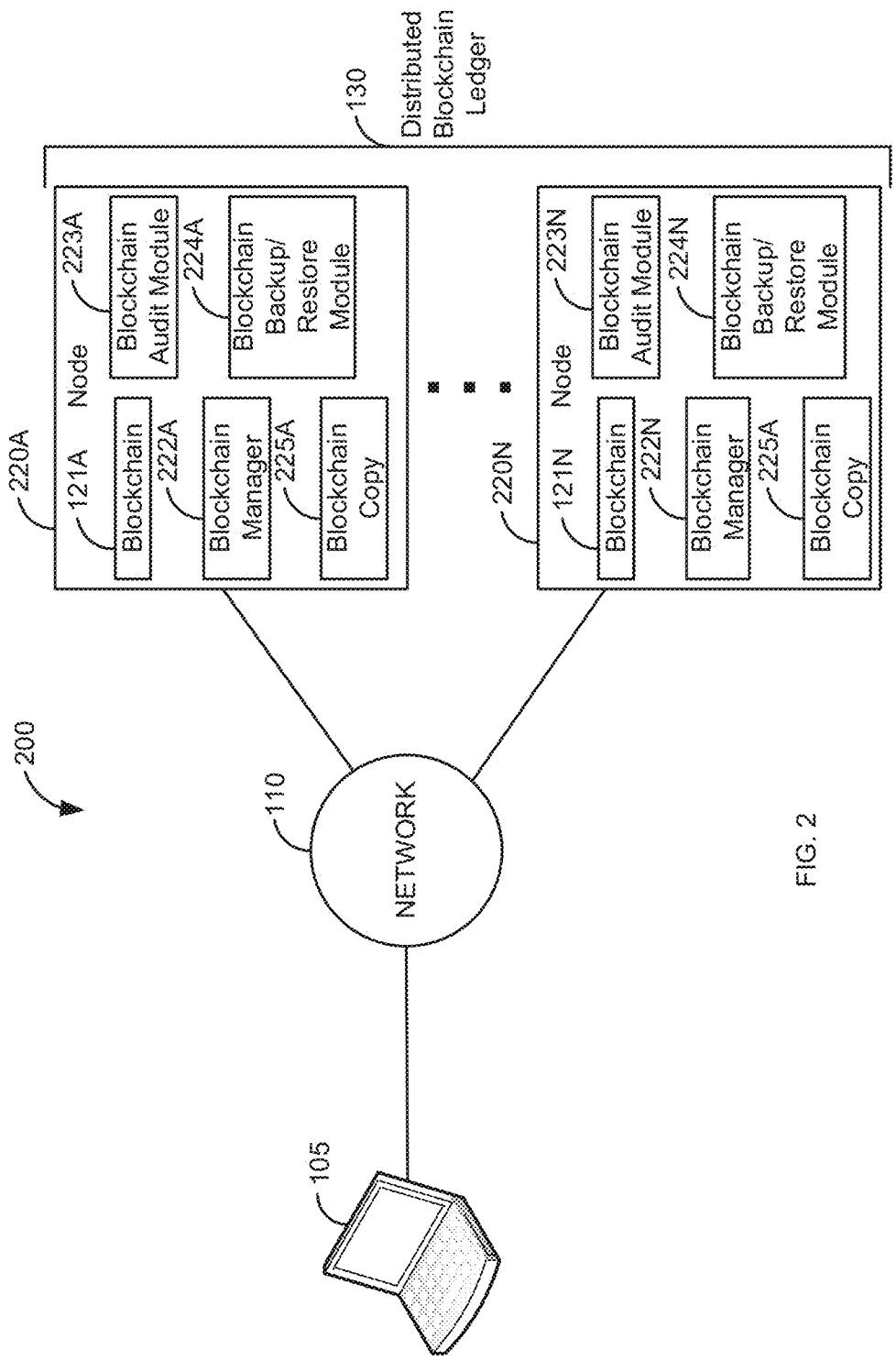
FIG. 2 is a block diagram of a second illustrative system for auditing a blockchain using nodes of a distributed blockchain ledger.

FIG. 2 is a block diagram of a second illustrative system 200 for auditing a blockchain 121 using nodes 220A-220N of a distributed blockchain ledger 130. The second illustrative system 200 comprises the communication endpoint 105, the network 110, nodes 220A-220N, and the distributed ledger 130. The blockchains 121A-121N form the distributed ledger 130.

The nodes 220A-220N comprise the blockchains 121A-121N, blockchain managers 222A-222N, blockchain audit modules 223A-223N, blockchain backup/restore modules 224A-224N, and blockchain copies 225A-225N. The nodes 220A-220N may be or may include any hardware nodes that can store the blockchains 121A-121N. The nodes 220A-220N may be server nodes, client nodes, and/or the like.

The blockchain managers 222A-222N may be similar or different from the blockchain managers 122A-122N. In FIG. 2, the blockchain managers 222A-222N are used in a distributed manner without a centralized manager.

The blockchain audit modules 223A-223N may be similar or different from the blockchain audit modules 123A-123N. The blockchain audit modules 223A-223N are used in a distributed manner without a centralized manager.

The blockchain backup/restore modules 224A-224N are a distributed version of the blockchain backup/restore system 103. The blockchain backup/restore modules 224A-224N use a consensus vote to backup/restore the blockchains 121A-121N.

The blockchain copies 225A-225N are stored copies of the blockchain 121. In FIG. 2, each node 220A-220N contain a copy of the blockchain 121.

FIGS. 3-6 described processes that can be implemented in a centralized manner as described in FIG. 1 or in a non-centralized manner as described in FIG. 2. One of skill in the art would recognize that any of the processes described herein may work in both a centralized manner or a non-centralized manner.

Figure 3:
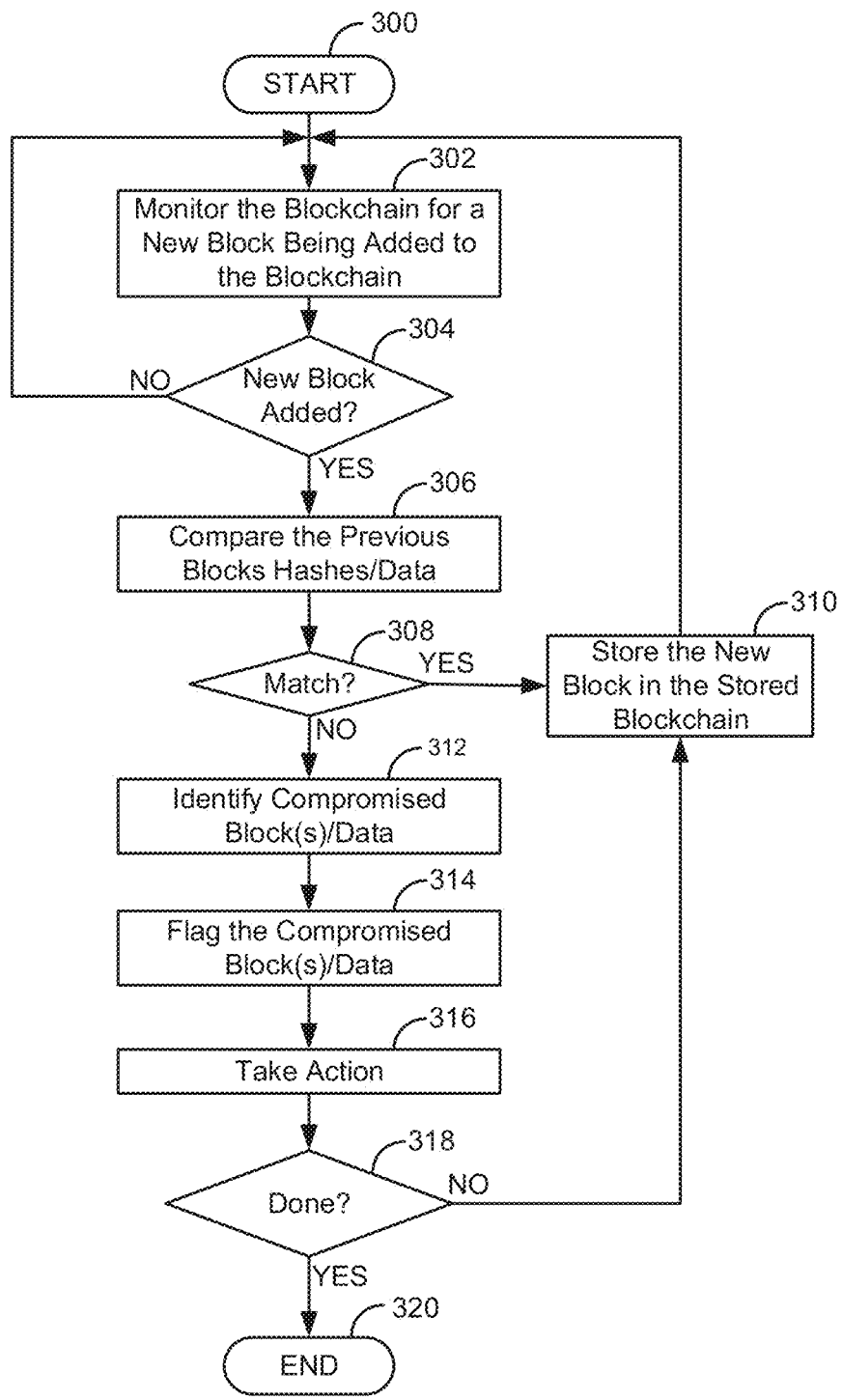
FIG. 3 is a flow diagram of a process for auditing a blockchain.

FIG. 3 is a flow diagram of a process for auditing a blockchain 121. Illustratively, the blockchain auditing system 101, the blockchain auditor 102, the blockchain backup/restore system 103, the communication endpoint 105, the network 110, the nodes 120A-120N, the blockchain managers 122A-122N, the blockchain audit modules 123A-123N, the nodes 220A-220N, the blockchain managers 222A-222N, the blockchain audit modules 2223A-223N, and the blockchain backup/restore modules 224A-224N are stored-program-controlled entities, such as a computer or microprocessor, which performs the method of FIGS. 3-6 and the processes described herein by executing program instructions stored in a computer readable storage medium, such as a memory (i.e., a computer memory, a hard disk, and/or the like). Although the methods described in FIGS. 3-6 are shown in a specific order, one of skill in the art would recognize that the steps in FIGS. 3-6 may be implemented in different orders and/or be implemented in a multi-threaded environment. Moreover, various steps may be omitted or added based on implementation.

A blockchain 121 can be implemented in different ways, depending upon configuration. In some embodiments, the blockchain 121 may contain a pointer to the data (e.g., data associated with a transaction, such as an amount of money being transferred, who the money is being transferred to, etc.) that is protected by the blockchain hash. Alternatively, the blockchain 121 itself may contain all the data that is protected by the blockchain hash. The advantage to using a pointer to the data is that the size of the blockchain 121 is much smaller if the data is large and/or the blockchain 121 is long. Each block in the blockchain 121 contains a hash of the previous block and a hash of its own data. In essence, the blockchain 121 is a linked list of hashes.

The blockchains 121 are typically considered immutable because of the distributed nature of the blockchain 121. However, the data of the blockchain 121 can be compromised by determining a hash collision on the data of one or more blocks in the blockchain 121. A hash collision is where different data causes the same hash value as the original data in the block. Typically, only a forward hash is done on the blockchain 121. As a result, the blockchain 121 may become compromised if the data of a block in the blockchain 121 has been changed, but still results in the same hash value. For example, if the blocks in the blockchain 121 have a link to the data, the data in one or more blocks may be changed using a hash collision. The end results is that the blockchain 121 has become compromised without detection.

The process starts in step 300. The blockchain auditor 102/blockchain audit modules 123A-123N/223A-223N monitors the blockchain 121 for a new block being added to the blockchain 121 in step 302. If a new block is not being added in step 304, the process goes back to step 302.

A new block is added to the blockchain 121 based on verification of an encryption key. For example, the owner of a crypto-currency uses their private key to verify that the transaction is valid. Each of the blockchain auditing modules 123A-123N validate that the transactions is valid based on the public key. If a new block is being added in step 304, the blockchain auditor 102/blockchain audit modules 123A-123N/223A-223N compares hashes of the previous blocks as well as validating the transaction using the public key to validate the new block should be added.

The blockchain auditor 102/blockchain audit modules 123A-123N/223A-223N compares the previous blocks/hashes/data in step 306. For example, the blockchain auditor 102/blockchain audit modules 123A-123N/223A-223N compare a calculated forward hash of the blockchain 121 in the distributed ledger 130 to a calculated forward hash of the blockchain copy 104/225A-225N. If the comparison of step 306 is a match in step 308, the blockchain auditor 102/blockchain audit modules 123A-123N/223A-223N stores the new block in the blockchain copy 104/225A-225N in step 310. The process then goes back to step 302.

A key difference in the comparison of step 306 versus the traditional comparison of nodes 120A-120N/220A-220N of the blockchains 121A-121N is that the hash value for the new block is not part of the compare process of step 306. In FIG. 3, the new block is added to the blockchain copy 104/225A-225N after the hash check is completed. With traditional blockchain comparisons by the nodes 120A-120N/220A-220N, when a new block is added, the hash of the new block is part of the hash check process by each of the nodes 120/220A-220N.

If the comparison of step 308 is not a match, the blockchain auditor 102/blockchain audit modules 123A-123N/223A-223N identify the compromised blocks/data in the blockchain 121 in step 312. For example, if a forward hash of the data in one of the blocks does not match what is stored in the blockchain copy 104/225A-225N, that block is identified in step 312. The identified blocks/data are then flagged in step 314. The flagging of step may comprise storing the flagged blocks in a database and/or log.

The blockchain auditor 102/blockchain audit modules 123A-123N/223A-223N then take an action in step 316. The action of step 316 may vary based on implementation/administration. For example, the action may one or more of: restoring at least a portion of the blockchain 121 in the distributed ledger 130 from the blockchain copy 104/225A-225N, identifying at least one or more blocks of the blockchain 121 in the distributed ledger 130 that have been compromised (e.g., to an administrator), identifying one or more fields (e.g., a user name) of individual blocks of the blockchain 121 the distributed ledger 130 as being compromised, displaying data of a compromised block in the distributed blockchain 121 to corresponding data in a block in the blockchain copy 104/225A-225N, sending a message to other nodes 120A-102N/220A-220N in the distributed ledger 130 that identifies the compromise of the blockchain 121 in the distributed ledger 130, and/or the like.

The blockchain backup/restore system 103/blockchain backup/restore modules 224A-224N may restore the compromised blockchain 121. Here, the blockchain copy 104/225A-225N is used as a backup blockchain if needed in order to restore the blockchain 121 to its original state if it is determined that the blockchain 121 was actually compromised based on an attack. In this case, each of the nodes 120/220 that have the copy of the blockchain 121 are updated. This includes the data if pointed to by a link. For example, the data may be in a database on a different server. In this case, the data pointed to by the link is also restored. The nodes 120/220 use a secure backup/restore process. The secure backup/restore process could restore the whole blockchain 121 or the process may restore only the compromised blocks.

One issue with the above process as described in FIG. 1 (e.g., a centralized blockchain backup system) is that there is a single point of attack, which counteracts the primary advantage of blockchain 121. To counter this, one option is to have a distributed backup system that works similar to blockchain 121 as shown in FIG. 2. There would be a number of distributed nodes 220 that work in a similar manner to blockchain 121. The nodes 220 would have to get consensus from all the nodes 220 to initiate a restoration of the blockchain 121. In order to do a restoration of the blockchain 121, each of the nodes 220 that have the current blockchain 121 get approval from all the nodes 220 (or at least a majority) that this is a valid restoration of a compromised blockchain 121 before the blockchain 121 is restored. This process may also work where the whole blockchain 121 is restored or where only the compromised block(s)/individual fields in the blockchain 121 are restored. The blockchain backup/restore modules 224A-224N are responsible for performing the consensus vote to do a restoration of the blockchain 121.

When a new block is added to the blockchain 121, the blockchain auditing system 101/blockchain auditing modules 223A-223N independently stores the added block to blockchain copy 104/225A-225N. The blockchain auditing system 101/blockchain auditing modules 223A-223N also gets the blockchain 121 and compares it with the blockchain copy 104/225A-225N to see if any of the blocks in the entire blockchain 121 up, but not including the new block. Thus, if part of the blockchain 121 (any previous blocks) have been compromised, the system automatically can detect in real-time that the blockchain 121 has been compromised.

The process determines in step 318 if the process is done. If the process is done in step 318, the process ends in step 320. Otherwise, if the process is not done in step 318, the process goes to step 310 and stores the new block in the blockchain copy 104/225A-225N.

The process of FIG. 3 can be done in real-time when each new block is added to the blockchain 121. One key advantage to this type of auditing is that it can be used as an input to detect a consensus attack on the blockchain 121 in real-time. For example, if the last 10 blocks in the blockchain 121 have been replaced by new blocks as part of a consensus attack, this will be detected.

FIG. 3 is described as being implemented for every block being added. However, the auditing may also accomplished by periodically (using the above block storage mechanism). For example, the auditing process (step 306) may occur every 10 minutes or based on a number of blocks being added to the blockchain 121 (e.g., when new 10 blocks are added to the blockchain 121). One advantage is that this method does not require as many processing resources versus monitoring the blockchain 121 every time a new block is added to the blockchain 121.

The auditing time/period may change based on other events, such as the consensus auditing discussed below in FIGS. 5-6. For example, if there is less than 100% consensus of adding a new block, the system will cause the auditing system to automatically initiate a consensus/hash collision audit in step 306. The auditing time/period may change based on other events, such as, anomaly detection in the blockchain 121.

Figure 4:
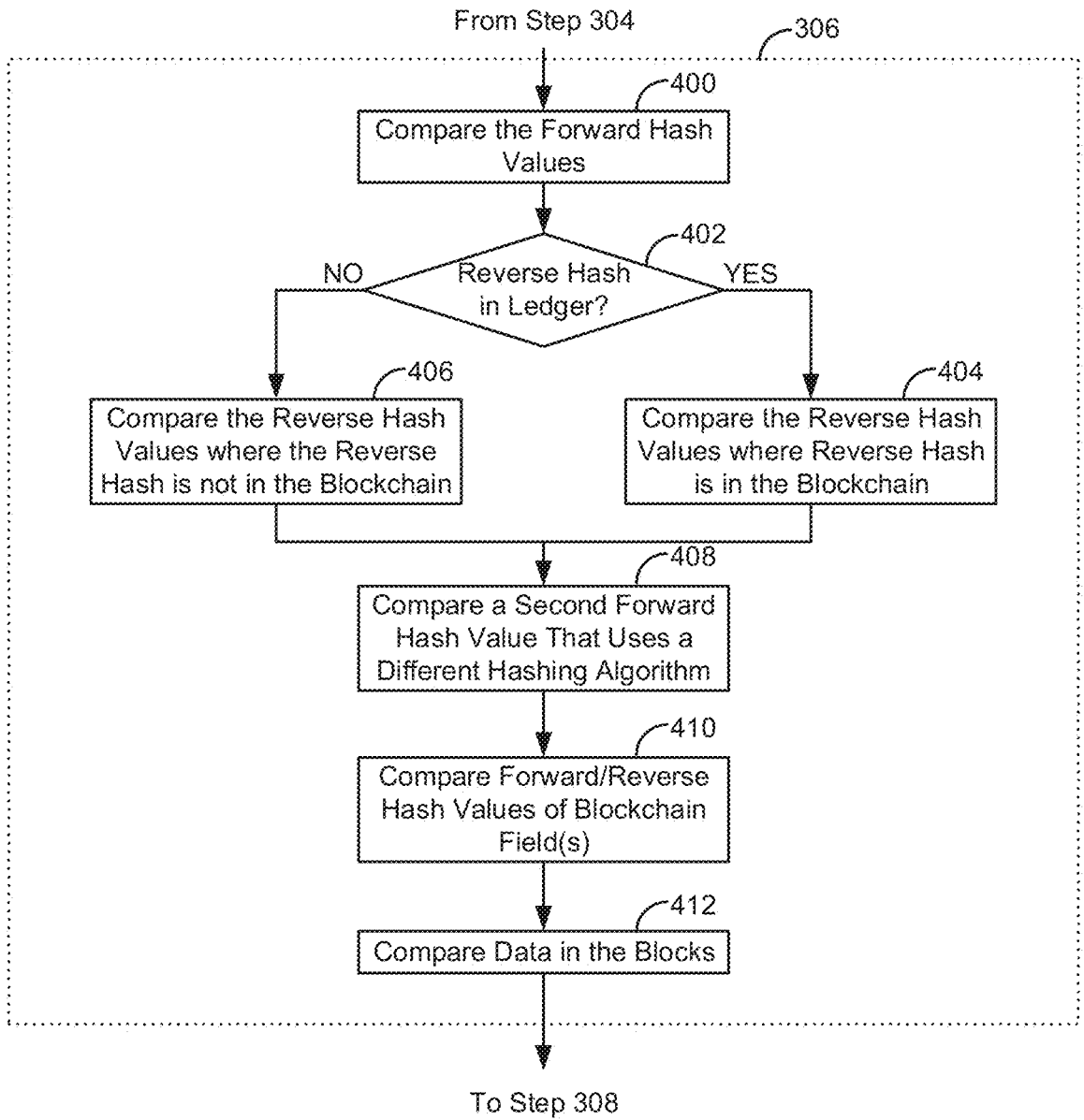
FIG. 4 is a flow diagram of a process for identify if a blockchain has been compromised.

FIG. 4 is a flow diagram of a process for identify if a blockchain 121 has been compromised. The process of FIG. 4 is an exemplary embodiment of step 306 of FIG. 3. FIG. 3 describes various ways that the blockchain copy 104/225A-225N may be used to identify that the blockchain 121 has been compromised. In FIG. 4, the steps 400, 404/406, 408, 410, and 412 are shown to all be implemented in series. As one of skill in the art would recognize, that the steps 400, 404, 406, 408, 410, and 412 may be done in parallel or done until a mismatch is detected. In addition, any combination of the steps 400, 404, 406, 408, 410, and may be implemented in any order or combination, including only implementing a single step of the steps 400, 404, 406, 408, 410, and 412.

After determining that a new block is to be added to the blockchain 121 in step 304, the blockchain auditor 102/blockchain audit modules 123A-123N/223A-223N does a comparison of a calculated forward hash of the blockchain 121 in the distributed ledger 130 to a calculated forward hash of the stored blockchain copy 104/225A-225N in step 400. The comparison of step 400 does not include a forward hash of the new block. Step 400 is used to detect where a consensus vote has caused one or more bad blocks to be added to the blockchain 121.

The blockchain auditor 102/blockchain audit modules 123A-123N/223A-223N determines, in step 402 if a reverse hash is in the blockchain 121 in the distributed ledger 130. If the reverse hash is in the blockchain 121 in the distributed leger in step 402, the blockchain auditor 102/blockchain audit modules 123A-123N/223A-223N does a comparison of a calculated reverse hash of the blockchain 121 in the distributed ledger 130 to a reverse hash of the blockchain copy 104/225A-225N in step 404. In this embodiment the comparing does not include a comparison of a reverse hash associated with the new block. The process then goes to step 408.

Otherwise, if the reverse hash is not stored in the blockchain in the distributed ledger in step 402, the blockchain auditor 102/blockchain audit modules 123A-123N/223A-223N does a comparison of a calculated reverse hash calculated against the blockchain 121 in the distributed ledger 130 to a calculated reverse hash of the blockchain copy 104/225A-225N in step 406. In this example, the distributed ledger 130 does not have any kind of reverse hash. The blockchain copy 104/225A-225N may contain the reverse hash that is added as new blocks are added to the blockchain copy 104/225A-225N in step 310. Alternatively, the reverse hash may be stored separately from the blockchain copy 104/225A-225N. The process then goes to step 408.

The blockchain auditor 102/blockchain audit modules 123A-123N/223A-223N does a comparison of a calculated second forward hash calculated against the blockchain 121 in the distributed ledger 130 to a calculated second forward hash of the blockchain copy 104/225A-225N in step 408. In this embodiment, the distributed ledger 130 does not contain the calculated second forward hash because the second forward hash uses a different hashing algorithm than is used to calculate the forward hash that is done on the blockchain 121 in the distributed ledger 130. By doing a second forward hash using a different hashing algorithm, this will detect a hash collision that has occurred using the original forward hash of the blockchain 121. The second hash may be calculated and stored in the blockchain copy 104/225A-225N in step 310.

The blockchain auditor 102/blockchain audit modules 123A-123N/223A-223N does a comparison of at least one of: a forward hash and/or a reverse hash calculated against one or more fields the blockchain 121 in the distributed ledger 130 to at least one of: a forward hash and/or a reverse hash against the one or more fields in the blockchain copy 104/225A-225N in step 410. A field may be any type of field, such as, a user name, an amount of money, a social security number, an address, a log field, a floating point value, a string, a number, and/or the like. This type of hash check can detect that an individual field in the blockchain 121 has been compromised. The hash of step 410 may be done one any number of fields in the blockchain 121. The hashing of individual fields may be calculated and stored in the blockchain copy 104/225A-225N in step 310.

The blockchain auditor 102/blockchain audit modules 123A-123N/223A-223N does a comparison of one or more fields of individual blocks of the blockchain 121 in the distributed ledger 130 to a respective one or more fields of individual blocks in blockchain copy 104/225A-225N in this step 412. Because the data should never change in the blockchain 121 in the distributed ledger 130, if the data in the blockchain copy 104/225A-225N is different, the field has clearly been compromised. The process then goes to step 308 to determine if there is a match in the comparisons.

The auditing of step 412 can be done in a periodic manner or in real-time to see if the transaction data has changed. For example, if the data in a specific field has changed, (e.g., if a field has been removed, if a field has been added, if an encryption key has changed, etc.) this will be flagged as an anomaly because the transaction data in a block should never change. This type of audit will detect a hash collision attack of where the hashes are still valid, but the transaction data has been compromised. Likewise, steps 400 and 404-408 may be done periodically or in real-time.

The process of FIG. 4 is described where a copy of the blockchain 121 is stored separately from the distributed ledger 130. However, in another embodiment, a copy of the blockchain 121 is not stored. Instead, the forward/reverse hashes described herein are stored along with a blockchain identifier and time stamps of each hash (forward/reverse) of each block in the blockchain 121. The blockchain identifier is used by the blockchain auditor 102/blockchain audit modules 123A-123N/223A-223N for monitoring more than one blockchain 121. By storing the calculated hashes, it saves processing resources because the hashes of the blocks in the blockchain do not have to be recalculated each time.

The use of calculated hashes can apply to the embodiments where the blockchain 121 is copied.

Figure 5:
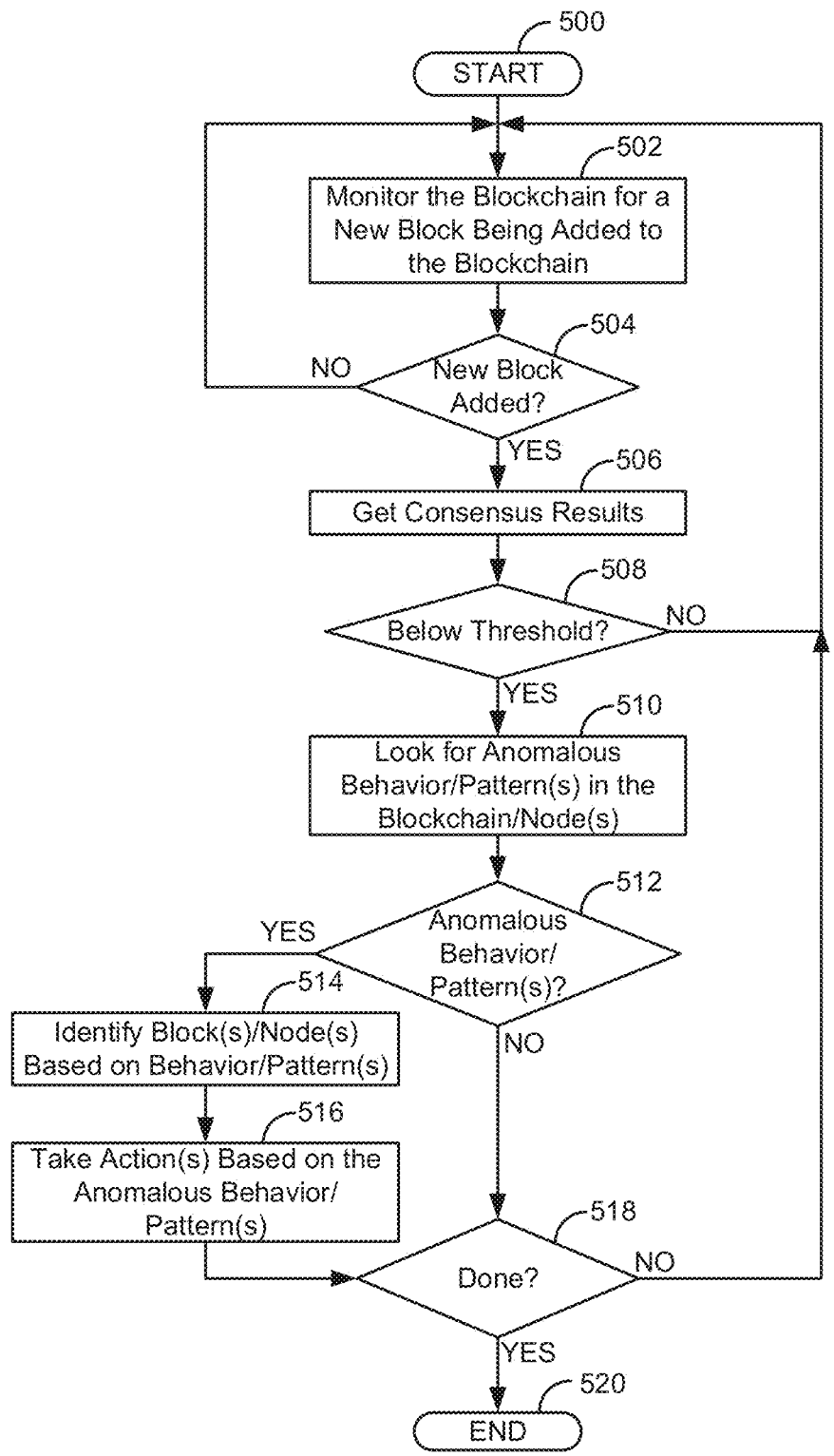
FIG. 5 is a flow diagram of a process for identifying a consensus attack.

FIG. 5 is a flow diagram of a process for identifying a consensus attack. The process starts in step 500. The blockchain auditor 102/blockchain audit modules 123A-123N/223A-223N monitors the blockchain 121 to determine if a new block is being added to the blockchain 121 in step 502. If a new block is not being added to the blockchain 121 in step 504, the process goes back to step 502 to wait for a new block to be added to the blockchain 121.

If a new block is to be added in step 504, the blockchain auditor 102/blockchain audit modules 123A-123N/223A-223N get the consensus results in step 506. A consensus vote is where the nodes 120A-120N/220A-220N vote to determine if the new block is valid and should allowed to be added to the blockchain 121. In traditional blockchain, if there is a consensus vote of greater than 50%, the new block is added to the blockchain 121. One problem with this approach is that if more than 50% of the nodes 120A-120N/220A-220N are compromised, the newly added block will be compromised. The process of FIG. 5 designed to detect this type of consensus attack.

The consensus results (e.g., percentage of nodes 120A-120N/220A-220N that approved the new block) are compared to a threshold. For example, where the blockchain auditor 102/blockchain audit modules 123A-123N/223A-223N detect where there is less than 100% consensus (excluding cases of chain extensions).

If there is not 100% consensus (or a defined threshold, such as a percentage of the voting nodes 120/220 (e.g., 98%), the blockchain auditor 102/blockchain audit modules 123A-123N/223A-223N may look for anomalous behavior. For example, the blockchain auditor 102/blockchain audit modules 123A-123N/223A-223N may look at the nodes 120A-120N/220A-220N to identify the nodes 120A-120N/220A-220N that are now voting both above and below the threshold. The blockchain auditor 102/blockchain audit modules 123A-123N/223A-223N may also look at the transactions on the blocks, the destination of the transaction (e.g., a user who is receiving monies of the transaction), the transaction data, etc. The threshold may be a learned threshold. For example, if the consensus is typically 99% or greater, the threshold may be the learned average minus a percentage (e.g., 99%-2%=97% threshold).

The blockchain auditor 102/blockchain audit modules 123A-123N/223A-223N can compare the information in the new block where there is not 100% consensus back into the blockchain 121 to see if there seems to be anomalous behavior based on adding the new block into the blockchain 121 (i.e., what is different about this block where there is a 51% consensus to blocks where there was 100% consensus). If the data in the new block is inconsistent with previous data, this can be flagged as a potential attempt to compromise the blockchain 121.

The blockchain auditor 102/blockchain audit modules 123A-123N/223A-223N may also use machine learning to compare between (typically similar, but not necessarily) blockchains 121 of other users/devices/data to see if similar patterns are happing in other blockchains (e.g., a coordinated attach against multiple blockchains 121/users). The blockchains 121 of other users may be compared based on a machine learning algorithm to see if the new block is anomalous in comparison with other similar types of blocks of other user's blockchains 121 or the same user's blockchain 121. For example, if the blockchain 121 is for auditing transactions in a database of user A and user A performs a series of transactions (Read/Write) and now User A executes a delete transaction where it previously was never executed by user A, it can be flagged. This could further cause a comparison of blockchains 121 of other users to see if a similar transaction pattern has occurred. If the transaction is anomalous in relation to all the other users, this could be flagged.

The blockchain auditor 102/blockchain audit modules 123A-123N/223A-223N can also be used as a mechanism for auditing multiple transactional databases. That is where each database has its own blockchain 121. If all databases have the same sets of transaction types and the same patterns are normally followed, then an anomaly in a the blockchain 121 can be found by comparing the different transactions/patterns in the other blockchains 121 to the blockchain 121 in the distributed ledger 130.

The blockchain auditor 102/blockchain audit modules 123A-123N/223A-223N can use machine learning to identify patterns that are similar when there is not a consensus based on previous non-consensus blocks. This could work similar to a virus scanner where identified patterns come from a pattern library that may be learned between systems/companies. For example, the blockchain auditor 102/blockchain audit modules 123A-123N/223A-223N could see if there are identical sources/destinations/transaction data when there is not a consensus to identify a possible nodes 120A-120N/220A-220N who are attempting to attack the blockchain 121. In this case, a similar pattern may be identified based on an attack of a different blockchain 121 or multiple other blockchains 121.

If there is not a consensus based on the threshold, the blockchain auditor 102/blockchain audit modules 123A-123N/223A-223N compares the blockchain 121 with the blockchain copy 104/225A-225N to determine what blocks, if any, between the current blockchain 121 and the blockchain copy 104/225A-225N are different as described in FIGS. 3-4. If there are any differences, the differences are flagged. The differences may be different hashes/different transaction data. The data can then be further analyzed in any of the ways described herein.

Another type of attack (short-term consensus attack) is where a (e.g., a large number of nodes 120A-120N/220A-220N start voting differently). This type of attack is designed to add a new compromised block to the blockchain 121. This would be flagged as an anomalous pattern because the consensus percentage would not normally change dramatically for a single block being added to the blockchain 121.

The blockchain auditor 102/blockchain audit modules 123A-123N/223A-223N could also be used to detect a consensus node attack wherein an attacker added bad nodes 120/220 to the voting consensus. Once the bad nodes 120/220 are added, the attacker could present a change that would be considered as a majority by a plurality of the nodes 120/220 and thus have replaced, or extended, the blockchain 121 with a compromised block or field.

As discussed above, in a consensus attack of a blockchain 121 (public or even a private blockchain 121), an attacker tries to gain a consensus of more than 50% of the nodes 120/220 by trying to add bad nodes 120/220 that will vote in favor of a compromised block. For more established blockchains 121 (e.g., like Bitcoin), this is may be more difficult because of the number of nodes 120/220 participating; for newer blockchains 121, this type of attack is more viable.

The auditor 102/blockchain audit modules 123A-123N/223A-223N can use pattern recognition to identify the specific nodes 120/220 that are trying to create a consensus attack. To illustrate, consider the flowing example. When the previous block was added to the blockchain 121 there were one hundred voting nodes 120/220. In the future there should be 100% consensus by the one hundred voting nodes 120/220. Now, the number of voting nodes 120/220 is changed and an additional one hundred and one voting nodes 120/220 are now added in a short period of time. This results in a consensus of over 50% because the new one hundred and one nodes 120/220 now vote to add a compromised block to the blockchain 121. Since the consensus vote now all of a sudden changes from 100% to just over 50%, this would be flagged as an anomaly and the newly added one hundred and one nodes 120/220 would be flagged as potential compromised nodes 120/220.

The blockchain auditor 102/blockchain audit modules 123A-123N/223A-223N can audit the activity of voting nodes 120/220 to identify patterns of the voting nodes 120/220. Typically, voting nodes 120/220 will join and then continue to vote. However, if the action of a voting node 120/220 appears anomalous in relation to other voting nodes behavior, the voting node 120/220 can be flagged as a potentially compromised node 120/220 or a defective node 120/220. For example, if you see a buildup pattern of voting nodes 120/220 in a first blockchain 121 that has been compromised, the same voting pattern may be used to detect a similar threat to a different blockchain 121 before the different blockchain 121 is compromised. For example, the time and number of nodes 120/220 (e.g., a percentage of voting nodes 120/220) that get added has a consistent pattern of being added before the consensus attack occurs.

The blockchain auditor 102/blockchain audit modules 123A-123N/223A-223N may look for similar actions of groups of voting nodes 120/220 over time. For example, an attacker may add groups of voting nodes 120/220 (a pattern) over a short period of time. Initially the newly added nodes 120/220 vote in consensus (part of the pattern). In this case, the attacker is building up new voting nodes 120/220 to eventually do a consensus attack when the attacker can achieve a consensus. In response, the blockchain auditor 102/blockchain audit modules 123A-123N/223A-223N may flag the quick buildup of groups of voting nodes 120/220 as a potential consensus attack. For example, if the buildup of voting nodes 120/220 goes over a consensus threshold (e.g., 50% of the voting nodes 120/220) within a time period or based on an event, based on this pattern, information associated with the new voting nodes 120/220 may be analyzed and flagged.

Likewise, the location (e.g., country) of the IP addresses of voting nodes 120/220 may be analyzed to see if they are common or are suspect IP addresses. Alternatively, domain names of the voting nodes 120/220 may be checked to see if they appear to be suspect domain names. For example, a voting node 120/220 may be assigned a domain name by malicious program that can be detected using known algorithms. A suspect voting node 120/220 may be where a single node/IP address/URL has a large number of votes (e.g., a hacker quantum computing site) could also be flagged if anomalous. Another option would be to limit the number of voting nodes 120/220 that can be added over a period of time. For example, only X numbers of voting nodes 120/220 may be added each hour or each week. This could also include limiting voting privileges based on IP address ranges. For example, if a large group of voting nodes 120/220 with the IP address of 123.123.XXX all of a sudden become voting members, this may be flagged as being anomalous.

The blockchain auditor 102/blockchain audit modules 123A-123N/223A-223N may take proactive action on the voting nodes 120/220 that appear to be trying to instigate the consensus attack. For example, using the embodiment above, the system may send a message to all the uncompromised nodes 120/220 to block the IP addresses of the voting nodes 120/220 that appear to be compromised. In other words, the newly added voting nodes 120/220 are now on a denied party list by the remaining voting nodes 120/220. Likewise the blockchain auditor 102/blockchain audit modules 123A-123N/223A-223N may deny the voting nodes 120/220 that were added in the short period of time (a known attack pattern) to prevent a potential consensus attack before it is initiated. In one example, the older voting nodes 120/220 would have priority to deny new voting nodes 120/220. A voting node 120/220 may be given a higher score based on how long the voting node 120/220 has been active. Thus, the older voting nodes 120/220 could block new voting nodes 120/220 in a based the higher score. When a voting node 120/220 gets added, all voting nodes 120/220 would use this to compute the voting score of each voting node 120/220.

The blockchain auditor 102/blockchain audit modules 123A-123N/223A-223N can look for anomalies in voting nodes 120/220 based on response times. For example, if a response time of a voting node(s) 120/220 change over time, this may indicate that the voting node 120/220 may be suspect (e.g., that the node 120/220 has become a quantum computing node). If the same voting node 120/220 is a voter on another blockchain 121, the blockchain auditor 102/blockchain audit modules 123A-123N/223A-223N can look at what previously occurred on the other blockchain 121 to see if it is behaving similarly in the different blockchain 121 For example, the voting node 120/220, which is also in the other blockchain 121, starts responding much differently than in the other voting nodes 120/220 (e.g., much faster/slower or starts winning a much higher percentage of solving the hash puzzle that was previously done in the other blockchain 121), this can be flagged as an anomaly. Alternatively, if voting times of new voting nodes 120/220 are dramatically different than the norm (e.g., indicating a quantum computing node), this can be flagged.

The blockchain auditor 102/blockchain audit modules 123A-123N/223A-223N determines, in step 512, if there was an anomalous behavior/pattern in step 512. If there is not an anomalous behavior/pattern in step 512, the process goes to step 518. Otherwise, if there was an anomalous behavior/pattern in step 512, the blockchain auditor 102/blockchain audit modules 123A-123N/223A-223N identifies the blocks/nodes 120/220 based on the behavior/pattern in step 514 as discussed above.

The blockchain auditor 102/blockchain audit modules 123A-123N/223A-223N takes one or more actions, in step 516 based on the anomalous behavior/pattern(s) in step 512. For example, the blockchain auditor 102/blockchain audit modules 123A-123N/223A-223N may deny a voting node 120/220 from voting, flag the list of potential voting nodes 120/220 that may have been compromised, denying adding the new block to the blockchain 121, deny adding new nodes 120/220 for a time period, and/or the like.

The process determines, in step 518, if the process is done. If the process is done in step 518, the process ends in step 520. Otherwise, the process goes back to step 502.

The blockchain nodes 120/220 actually do the auditing functions discussed above. For example, the blockchain nodes 120/220 look for consensus attacks, hash collision attacks, etc. For example, if there not a consensus, the system may compare the previously stored blocks/data to see a consensus attack/hash collision attack is occurring in manner similar to what was discussed above.

Likewise, the blockchain nodes 120/220 look for the compromised nodes 120/220, compromised users, and/or destinations. If there is a consensus of a compromise, the nodes 120/220 each update their blacklists. For example, if a new node 120/220 appears to be compromised, all of the nodes 120/220 will blacklist the new node 120/220.

One issue with the blockchain auditing system 101 is that it is a centralized auditing system. By being centralized, it is more easily compromised, which defeats the advantage of blockchain 121. If the blockchain auditing system 101 becomes compromised, actions taken by the auditing system may actually compromise the blockchain itself. One way around this is to have a distributed auditing system that works similar to blockchain 121 where any actions have to be made based on a consensus. As discussed above, if the IP addresses of compromised nodes 120/220 that are on a denied party list are sent to the remaining nodes 120/220, a consensus of the nodes 120/220 of the auditing system is needed before any of the blockchain nodes 120/220 make the update. For example, if there are twenty nodes 120/220 and nineteen nodes 120/220 of the 20 nodes 120/220 determine that there has been a large buildup of new voting nodes 120/220 in a short time period (e.g., e.g., 15 nodes 120/220 in less than an hour), the nineteen nodes 120/220 an agree to block the newly added nodes 120/220. This could occur by having one of the nineteen nodes sending a vote request to the twenty nodes 120/220. The twenty nodes 120/220 would then vote. Based on the vote (a nineteen to one, a coconscious), the twenty nodes 120/220 will no longer consider voting by the new nodes 120/220. Older nodes can keep track of new nodes 120/220 and how long they have been active. A similar type process could be used where there is a dramatic change in the consensus. For example, if there typically a 98% consensus or better and now you all of a sudden see only a 51% consensus, the older nodes 120/220 may be able to vote and reject the newer voting nodes 120/220. In these examples, the block may be based on IP address (or any kind of address), URL, etc. The older nodes 120/220 can then keep a block list of addresses/URLs. The ability to vote/block may also be based on other factors, such as location (e.g., in a local network versus in a remote network), a trust relationship, etc.

The auditing system may be used to audit multiple blockchains 121/types of blockchains 121 in parallel.

Figure 6:
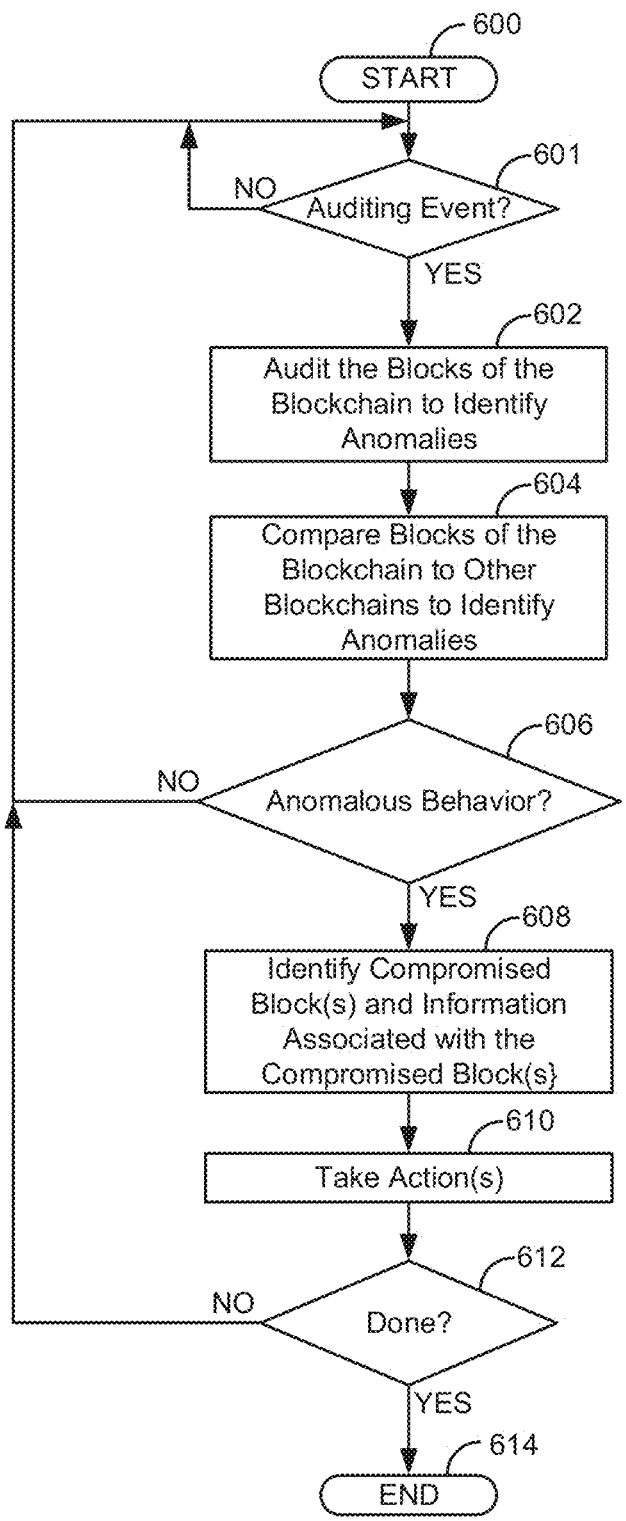
FIG. 6 is a flow diagram of a process for auditing blocks of a blockchain to identify if the data in the blockchain has been compromised.

FIG. 6 is a flow diagram of a process for auditing blocks of a blockchain 121 to identify if the data in the blockchain 121 has been compromised. The process starts in step 600. The blockchain auditor 102/blockchain audit modules 123A-123N/223A-223N determines, in step 601 if an auditing event has occurred. The auditing event of step 601 can be any event, such as, a new block being added to the blockchain 121, an administrator requesting the audit, an anomaly event, a consensus vote event, and/or the like. If an auditing event has not occurred in step 601, the process of step 601 continues to look for an auditing event to occur.

Otherwise, if an auditing event has occurred in step 601, the blockchain auditor 102/blockchain audit modules 123A-123N/223A-223N audits the blocks in the blockchain 121 to identify anomalies in step 602. The blockchain auditor 102/blockchain audit modules 123A-123N/223A-223N can detect anomalies in the blockchains 121 to identify if data in the blockchain 121 has been compromised and/or if the sources who added information to the blockchain 121 are compromised (e.g., a hacker has obtained a user's private key) by looking for anomalous behaviors. For example, if a user's behavior is completely different in the blockchain 121 up until a point of time or the user is now trying to access new systems/information that was never accessed before, this may be flagged as an anomaly. Other examples are, where a lot of logins occurred, the user logs in with a different device, the user logins in using a different biometric than previously, the user is in a new location, the user is spending money at completely new places, etc. The key difference is that it is auditing is done on information that is already stored in the blockchain 121 or on the information of a newly added block.

The blockchain auditor 102/blockchain audit modules 123A-123N/223A-223N can compare multiple blockchains 121/blocks to the blockchain 121/blocks where the blockchains are of the same type to identify anomalies in a specific blockchain 121 in step 604. The blockchain auditor 102/blockchain audit modules 123A-123N/223A-223N can use machine learning to identify the anomalies between blockchains 121. For example, an anomaly may be where a sequence of events stored in the blockchain 121 is different for one user versus all the other users. The blockchain auditor 102/blockchain audit modules 123A-123N/223A-223N can identify the block(s) that appear anomalous and then find the source/node 120/220 who introduced the block. In addition, other information, such as the destination and other transaction data can be used to identify potentially anomalous blocks. The blockchain auditor 102/blockchain audit modules 123A-123N/223A-223N may look at the time a block was added to the blockchain 121 and compare similar times of other user's (or the same user) where similar blocks were then added at similar times (e.g., login blocks) in the same or different blockchains 121.

The blockchain auditor 102/blockchain audit modules 123A-123N/223A-223N may also identify the source/destination of the anomalous data. The blockchain auditor 102/blockchain audit modules 123A-123N/223A-223N may compare the sources of anomalous data to see if there is a pattern of data from a specific source in the same blockchain 121 or between blockchains 121. The source may be a user, a company, an authentication system (e.g., the authentication system has been compromised), a device, etc. Likewise, the destination may be similar to the source (e.g., a user). The source/destination may be in different blockchains 121, so the blockchain auditor 102/blockchain audit modules 123A-123N/223A-223N can compare between the different blockchains 121 to see if similar sources/destinations are being used. The source/destination may be compared to an approved list/denied list of blockchain sources and/or destinations and/or voting nodes 120/220.

The blockchain auditor 102/blockchain audit modules 123A-123N/223A-223N can look for compromised groupings of blocks to detect a compromised pattern using machine learning. For example, the blockchain auditor 102/blockchain audit modules 123A-123N/223A-223N may look for a transfer of money to a denied list of IP address/URL or public key (which identifies a user) based on a pattern of similar users who were compromised. The blockchain auditor 102/blockchain audit modules 123A-123N/223A-223N can look at patterns like the time between when blocks are added, who was the source of the block, sequences of owners of the blocks, sequences of transactions associated with the blocks, approvers of the blocks (e.g., a voting node 120/220), and/or the like.

The blockchain auditor 102/blockchain audit modules 123A-123N/223A-223N determines, in step 606, if there was any anomalous behavior in step 606. If there is no anomalous behavior in step 606, the process goes back to step 602.

Otherwise, if there were anomalies in step 606, the blockchain auditor 102/blockchain audit modules 123A-123N/223A-223N can provide various ways to manage the attack. For example, the blockchain auditor 102/blockchain audit modules 123A-123N/223A-223N may identify which blocks are compromised in step 608. The blockchain auditor 102/blockchain audit modules 123A-123N/223A-223N may then take one or more actions in step 610. For example, the blockchain auditor 102/blockchain audit modules 123A-123N/223A-223N can provide an alert that the blockchain 121 has been potentially compromised to an administrator at the communication endpoint 105. The blockchain auditor 102/blockchain audit modules 123A-123N/223A-223N can compare the compromised block(s) to the same blocks that are stored by the blockchain auditor 102/blockchain audit modules 123A-123N/223A-223N to identify specific details of why the block(s) were compromised that is provided as part of the action(s) of step 610. The blockchain auditor 102/blockchain audit modules 123A-123N/223A-223N can then display the transaction data in the original block(s) and the compromised block(s) side by side to the administrator for analysis in step 610.

The auditing system may take specific actions based on detection of an attack. For example, the auditing system may send a message to all the nodes 120/220 that have the blockchain 121 to prevent a specific user (e.g., public key), specific device, specific application, specific IP address, from adding new blocks to the blockchain 121 or to reject any new blocks with a specific destination. In other words, the blockchain nodes 120/220 keep a denial list of compromised voting nodes 120/220, compromised users, compromised destinations, and/or the like.

The process determines, in step 612 if the process is done. If the process is not done in step 612, the process goes back to step 602. Otherwise, if the process is done in step 612, the process ends in step 614.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a computer readable medium, coupled with the microprocessor and comprising microprocessor readable and executable instructions that, when executed by the microprocessor, cause the microprocessor to:
    identify a request to add a new block to a blockchain;
    in response identifying the request to add the new block to the blockchain, monitor a consensus vote of a plurality of nodes to add the new block to the blockchain;
    determine if a selected outcome of the consensus vote of the plurality of nodes is below a threshold portion of the plurality of nodes; and
    in response to the selected outcome of the consensus vote being below the threshold portion, determine that the consensus vote is associated with potentially anomalous behavior associated with a consensus attack and perform an audit by at least one of:
    (a) compare selected information in the new block to information already in the blockchain to identify an anomaly;
    (b) compare the blockchain against one or more blockchains of other users to identify the anomaly;
    (c) determine a behavior pattern of one or more voting nodes participating in the consensus vote over time to identify the anomaly; and
    (d) analyze content in one or more fields in individual blocks in the blockchain to identify the anomaly.

2. The system of claim 1, wherein the audit comprises (a) comparing selected information in the new block to information already in the blockchain to identify an anomaly.

3. The system of claim 2, wherein the audit comprises determining if there is an anomaly between the new block and a similar block in a second blockchain.

4. The system of claim 1, wherein the audit comprises(b) comparing the blockchain against one or more blockchains of other users to identify the anomaly.

5. The system of claim 4, wherein the audit comprises at least one of:
    using machine learning to identify a pattern in the blockchain based on a previously identified pattern in a second blockchain;
    conducting a hash collision test;

identifying an attack the blockchain based on similar additions of blocks to a second blockchain at similar times;
identifying one or more sources and/or one or more destinations in the blockchain based one or more sources and/or destinations in the second blockchain;
comparing one or more addresses to an approved list of addresses; and
comparing the one or more sources and/or one or more destinations to an approved list of sources and/or destinations.

6. The system of claim 4, wherein the audit comprises identifying a pattern in the blockchain based on a previously identified pattern in a second blockchain, the previously identified pattern indicating the anomaly.

7. The system of claim 4, wherein the audit comprises conducting a hash collision test to identify the anomaly.

8. The system of claim 4, wherein the audit comprises identifying an attack the blockchain based on similar additions of blocks to a second blockchain at similar times.

9. The system of claim 4, wherein the audit comprises identifying one or more sources and/or one or more destinations in the blockchain based one or more sources and/or destinations in a second blockchain to identify the anomaly.

10. The system of claim 4, wherein the audit comprises comparing one or more addresses to an approved list of addresses to identify the anomaly.

11. The system of claim 4, wherein the audit comprises comparing one or more sources and/or one or more destinations to an approved list of sources and/or destinations to identify the anomaly.

12. The system of claim 1, wherein the audit comprises (c) determining a behavior pattern of one or more voting nodes participating in the consensus vote over time to identify the anomaly.

13. The system of claim 12, wherein the audit comprises at least one of:
identifying a short term consensus attack;
denying a voting node from voting;
comparing a voting pattern of a previous consensus attack on the blockchain;
identifying a buildup of voting nodes over a time period;
limiting a number of voting nodes over a period of time;
comparing a voting pattern of a previous consensus attack on a second blockchain;
identifying a buildup pattern of voting nodes that indicates an attempt to override the consensus vote;
identifying one or more suspect voting nodes based on Internet Protocol (IP) addresses and/or Universal Resource Locators (URLs); and
identifying the one or more suspect voting nodes based on a change in voting response time.

14. The system of claim 13, wherein the audit comprises identifying the buildup pattern of the voting nodes and wherein identifying the buildup pattern of the voting nodes is based on a buildup of a number of new voting nodes over a period of time in relation to an existing number of voting nodes.

15. The system of claim 14, wherein identifying the buildup pattern is determined by the number of existing voting nodes and wherein an existing number of voting nodes can block votes by the new voting nodes to prevent a consensus attack on the blockchain.

16. The system of claim 12, wherein the audit comprises comparing a voting pattern of a previous consensus attack on the blockchain to identify the anomaly.

17. The system of claim 12, wherein the audit comprises identifying a buildup of voting nodes over a time period to identify the anomaly.

18. The system of claim 12, wherein the audit comprises comparing a voting pattern of a previous consensus attack on a second blockchain to identify the anomaly.

19. The system of claim 12, wherein the audit comprises identifying a buildup pattern of voting nodes that indicates, as the anomaly, an attempt to override the consensus vote.

20. The system of claim 12, wherein the audit comprises identifying, as the anomaly, one or more suspect voting nodes based on Internet Protocol (IP) addresses and/or Universal Resource Locators (URLs).

21. The system of claim 12, wherein the audit comprises identifying, as the anomaly, one or more suspect voting nodes based on a change in voting response time.

22. The system of claim 1, wherein the audit comprises (d) analyze content in one or more fields in individual blocks in the blockchain to identify the anomaly.

23. The system of claim 22, wherein the audit comprises at least one of:
determining if a source and/or a destination field in the blockchain is anomalous;
determining if the source and/or the destination field in the blockchain is in a denied list of blockchain sources and/or destinations;
determining if a source associated with a field in the blockchain is attempting an anomalous behavior;
determining that the source associated with a field in the blockchain is in an anomalous location; and
comparing a transaction in a field in the blockchain with a transaction in a field in a second blockchain.

24. The system of claim 1, wherein the instructions, when executed by the microprocessor, cause the microprocessor to:
in response to the audit, identifying a potential attack on the blockchain; and
in response to identifying the potential attack on the blockchain, initiate an action.

25. A method comprising:
identifying, by a microprocessor, a request to add a new block to a blockchain;
in response identifying the request to add the new block to the blockchain, monitoring, by the microprocessor, a consensus vote of a plurality of nodes to add the new block to the blockchain;
determining, by the microprocessor, a selected outcome of the consensus vote of the plurality of nodes is below a threshold portion of the plurality of nodes; and
in response to the selected outcome of the consensus vote being below the threshold portion, the microprocessor determining that the consensus vote is associated with a potential anomaly associated with a consensus attack and performing an audit by at least one of:
(a) compare selected information in the new block to information already in the blockchain to identify an anomaly;
(b) compare the blockchain against one or more blockchains of other users to identify the anomaly;
(c) determine a behavior pattern of one or more voting nodes participating in the consensus vote over time to identify the anomaly; and
(d) analyze content in one or more fields in individual blocks in the blockchain to identify the anomaly.

26. The method of claim 25, wherein the audit comprises (a) comparing selected information in the new block to information already in the blockchain to identify an anomaly.

27. The method of claim 26, wherein the audit comprises determining if there is an anomaly between the new block and a similar block in a second blockchain.

28. The method of claim 25, wherein the audit comprises (b) comparing the blockchain against one or more blockchains of other users to identify the anomaly.

29. The method of claim 28, wherein the audit comprises at least one of:
using machine learning to identify a pattern in the blockchain based on a previously identified pattern in a second blockchain;
conducting a hash collision test;
identifying an attack on the blockchain based on similar additions of blocks to a second blockchain at similar times;
identifying one or more sources and/or one or more destinations in the blockchain based one or more sources and/or destinations in the second blockchain;
comparing one or more addresses to an approved list of addresses; and
comparing the one or more sources and/or one or more destinations to an approved list of sources and/or destinations.

30. The method of claim 25, wherein the audit comprises (c) determining a behavior pattern of one or more voting nodes participating in the consensus vote over time to identify the anomaly.

31. The method of claim 30, wherein the audit comprises at least one of:
identifying a short term consensus attack;
denying a voting node from voting;
comparing the new block to one or more blocks in a different blockchain;
comparing a voting pattern of a previous consensus attack on the blockchain;
identifying a buildup of voting nodes over a time period;
limiting a number of voting nodes over a period of time;
comparing a voting pattern of a previous consensus attack on a second blockchain;
identifying a buildup pattern of voting nodes that indicates an attempt to override the consensus vote;
identifying one or more suspect voting nodes based on Internet Protocol (IP) addresses and/or Universal Resource Locators (URLs); and
identifying the one or more suspect voting nodes based on a change in voting response time.

32. The method of claim 31, wherein the audit comprises identifying the buildup pattern of the voting nodes and wherein the identifying the buildup pattern of the voting nodes is based on a buildup of a number of new voting nodes over a period of time in relation to an existing number of voting nodes.

33. The method of claim 32, wherein the identifying the buildup pattern is determined by the number of existing voting nodes and wherein an existing number of voting nodes can block votes by the new voting nodes to prevent a consensus attack on the blockchain.

34. The method of claim 25, wherein the audit comprises (d) analyzing content in one or more fields in individual blocks in the blockchain to identify the anomaly.

35. The method of claim 34 wherein the audit comprises at least one of:
determining if a source and/or a destination field in the blockchain is anomalous;
determining if the source and/or the destination field in the blockchain is in a denied list of blockchain sources and/or destinations;
determining if a source associated with a field in the blockchain is attempting an anomalous behavior;
determining that the source associated with a field in the blockchain is in an anomalous location; and
comparing a transaction in a field with a transaction in a field in the blockchain in a second blockchain.

36. The method of claim 25, further comprising:
in response to performing the audit, identifying a potential attack on the blockchain; and
in response to identifying the potential attack on the blockchain, initiate an action.

37. A non-transitory computer readable medium comprising microprocessor executable instructions that, when executed, cause the a microprocessor to:
identify a request to add a new block to a blockchain;
in response identifying the request to add the new block to the blockchain, monitor a consensus vote of a plurality of nodes to add the new block to the blockchain;
determine if a selected outcome of the consensus vote of the plurality of nodes is below a threshold portion of the plurality of nodes; and
in response to the selected outcome of the consensus vote being below the threshold portion, determine that the consensus vote is associated with a potential anomaly associated with a consensus attack and perform an audit by at least one of:
(a) compare selected information in the new block to information already in the blockchain to identify an anomaly;
(b) compare the blockchain against one or more blockchains of other users to identify the anomaly;
(c) determine a behavior pattern over time of one or more voting nodes participating in the consensus vote to identify the anomaly; and
(d) analyze content in one or more fields in individual blocks in the blockchain to identify the anomaly.

38. The non-transitory computer readable medium of claim 37, wherein the audit comprises (a) comparing selected information in the new block to information already in the blockchain to identify an anomaly.

39. The non-transitory computer readable medium of claim 38, wherein the audit comprises determining if there is an anomaly between the new block and a similar block in a second blockchain.

40. The non-transitory computer readable medium of claim 37, wherein the audit comprises(b) comparing the blockchain against one or more blockchains of other users to identify the anomaly.

41. The non-transitory computer readable medium of claim 40, wherein the audit comprises at least one of:
using machine learning to identify a pattern in the blockchain based on a previously identified pattern in a second blockchain;
conducting a hash collision test;
identifying an attack the blockchain based on similar additions of blocks to a second blockchain at similar times;
identifying one or more sources and/or one or more destinations in the blockchain based one or more sources and/or destinations in the second blockchain;

comparing one or more addresses to an approved list of addresses; and comparing the one or more sources and/or one or more destinations to an approved list of sources and/or destinations.

42. The non-transitory computer readable medium of claim 37, wherein the audit comprises (c) determining a behavior pattern of one or more voting nodes participating in the consensus vote over time to identify the anomaly.

43. The non-transitory computer readable medium of claim 42, wherein the audit comprises at least one of:
   identifying a short term consensus attack;
   denying a voting node from voting;
   comparing a voting pattern of a previous consensus attack on the blockchain;
   identifying a buildup of voting nodes over a time period;
   limiting a number of voting nodes over a period of time;
   comparing a voting pattern of a previous consensus attack on a second blockchain;
   identifying a buildup pattern of voting nodes that indicates an attempt to override the consensus vote;
   identifying one or more suspect voting nodes based on Internet Protocol (IP) addresses and/or Universal Resource Locators (URLs); and
   identifying the one or more suspect voting nodes based on a change in voting response time.

44. The non-transitory computer readable medium of claim 43, wherein the audit comprises identifying the buildup pattern of the voting nodes and wherein identifying the buildup pattern of the voting nodes is based on a buildup of a number of new voting nodes over a period of time in relation to an existing number of voting nodes.

45. The non-transitory computer readable medium of claim 44, wherein identifying the buildup pattern is determined by the number of existing voting nodes and wherein an existing number of voting nodes can block votes by the new voting nodes to prevent a consensus attack on the blockchain.

46. The non-transitory computer readable medium of claim 37, wherein the audit comprises (d) analyze content in one or more fields in individual blocks in the blockchain to identify the anomaly.

47. The non-transitory computer readable medium of claim 46, wherein the audit comprises at least one of:
   determining if a source and/or a destination field in the blockchain is anomalous;
   determining if the source and/or the destination field in the blockchain is in a denied list of blockchain sources and/or destinations;
   determining if a source associated with a field in the blockchain is attempting an anomalous behavior;
   determining that the source associated with a field in the blockchain is in an anomalous location; and
   comparing a transaction in a field in the blockchain with a transaction in a field in a second blockchain.

48. The non-transitory computer readable medium of claim 37, wherein the instructions, when executed by the microprocessor, cause the microprocessor to:
   in response to the audit, identifying a potential attack on the blockchain; and
   in response to identifying the potential attack on the blockchain, initiate an action.

* * * * *